(12) United States Patent
Liu et al.

(10) Patent No.: US 10,340,787 B2
(45) Date of Patent: Jul. 2, 2019

(54) POWER FACTOR CORRECTION STAGE CONTROL DURING START-UP FOR EFFICIENT USE OF A NEGATIVE TEMPERATURE COEFFICIENT THERMISTOR

(71) Applicant: Astec International Limited, Kowloon (HK)

(72) Inventors: Jun Liu, Shenzhen (CN); Qingfeng Liu, Shenzhen (CN); Zhaotu Fan, Shenzhen (CN); Zhe Li, Shenzhen (CN)

(73) Assignee: Astec International Limited, Kwun Tong, Kowloon (HK)

( * ) Notice: Subject to any disclaimer, the term of this patent is extended or adjusted under 35 U.S.C. 154(b) by 52 days.

(21) Appl. No.: 14/782,988

(22) PCT Filed: Apr. 17, 2015

(86) PCT No.: PCT/CN2015/076890
§ 371 (c)(1),
(2) Date: Oct. 7, 2015

(87) PCT Pub. No.: WO2016/165133
PCT Pub. Date: Oct. 20, 2016

(65) Prior Publication Data
US 2017/0141678 A1    May 18, 2017

(51) Int. Cl.
*H02M 1/42* (2007.01)
*H02M 7/06* (2006.01)
(Continued)

(52) U.S. Cl.
CPC .......... *H02M 1/4241* (2013.01); *H02H 9/001* (2013.01); *H02M 1/32* (2013.01);
(Continued)

(58) Field of Classification Search
CPC ........ H02M 1/4241; H02M 1/32; H02M 7/06; H02M 2001/327
See application file for complete search history.

(56) References Cited

U.S. PATENT DOCUMENTS 5,715,154 A * 2/1998 Rault ..................... H02H 9/001
                                                                      323/908
5,834,924 A * 11/1998 Konopka ............... H02H 9/001
                                                                      323/222
(Continued)

FOREIGN PATENT DOCUMENTS

| CN | 101268597 | 9/2008 |
| CN | 201336630 | 10/2009 |

(Continued)

*Primary Examiner* — Jue Zhang
*Assistant Examiner* — Bart Iliya
(74) *Attorney, Agent, or Firm* — Harness, Dickey & Pierce, P.L.C.

(57) ABSTRACT

A power factor correction (PFC) stage of a power supply unit has a PFC circuit including a rectifier circuit, a PFC controller circuit with a PFC switch, a current sensor connected to the PFC switch, a high frequency bypass capacitor connected between the PFC controller circuit and the rectifier circuit, and a bulk storage capacitor connected between the PFC controller circuit and an output of the PFC stage. The PFC stage also has a negative temperature coefficient thermistor connected in series with the PFC switch and the current sensor. During a start-up of the power supply unit, the PFC controller circuit causes the PFC switch to turn-on until the PFC controller circuit causes the PFC switch to turn-off after a current through the current sensor is sensed as being equal to or greater than a preset value.

14 Claims, 2 Drawing Sheets

(51) Int. Cl.
  *H02M 1/32* (2007.01)
  *H02M 1/36* (2007.01)
  *H02H 9/00* (2006.01)
(52) U.S. Cl.
  CPC ........... *H02M 1/36* (2013.01); *H02M 1/4225* (2013.01); *H02M 7/06* (2013.01); *H02M 2001/327* (2013.01); *Y02B 70/126* (2013.01); *Y02P 80/112* (2015.11)

(56) References Cited

U.S. PATENT DOCUMENTS

| | | | | |
|---|---|---|---|---|
| 2002/0080630 | A1* | 6/2002 | Hodge, Jr. | H02H 9/001 363/50 |
| 2002/0130640 | A1* | 9/2002 | Acatrinei | G05F 1/70 323/222 |
| 2007/0014134 | A1* | 1/2007 | Shih | H02H 9/001 363/52 |
| 2008/0224636 | A1* | 9/2008 | Melanson | H05B 33/0815 315/307 |
| 2010/0014330 | A1* | 1/2010 | Chang | H02M 1/4225 363/89 |
| 2011/0221402 | A1* | 9/2011 | Park | G05F 1/70 323/211 |
| 2013/0223120 | A1 | 8/2013 | Dragojevic et al. | |
| 2013/0307422 | A1* | 11/2013 | Palmer | H05B 33/0854 315/186 |
| 2016/0126859 | A1* | 5/2016 | Wang | G06F 1/263 713/300 |
| 2016/0360582 | A1* | 12/2016 | Kato | H05B 33/0815 |
| 2017/0184294 | A1* | 6/2017 | Tao | F21V 25/04 |

FOREIGN PATENT DOCUMENTS

| | | |
|---|---|---|
| CN | 104218824 | 12/2014 |
| JP | 2000-92695 | 3/2000 |
| JP | 2015-73366 | 4/2015 |

* cited by examiner

POWER FACTOR CORRECTION STAGE CONTROL DURING START-UP FOR EFFICIENT USE OF A NEGATIVE TEMPERATURE COEFFICIENT THERMISTOR

FIELD

The present disclosure relates to power factor correction (PFC) stages of power supply units. More specifically, the present disclosure relates to the use of negative temperature coefficient (NTC) thermistors for limiting in-rush current and efficiently lowering a resistance of the NTC thermistor during start-up.

BACKGROUND

This section provides background information related to the present disclosure which is not necessarily prior art.

Start-up issues, particularly at full load and a low ambient temperature, are known to power supply designers. For example, NTC thermistors are commonly used as an in-rush current limiter to reduce the likelihood of tripping a fuse or damaging the power supply unit component parts. NTC thermistors are designed such that their resistance drops as the device heats up. If the resistance of the NTC thermistor is too high at start-up, e.g. if the ambient temperature is particularly cold, a high voltage drop at the PFC stage output may prevent the power supply unit from powering up and functioning properly.

It is known to delay starting the PFC circuit until the bulk storage capacitor is fully charged. This results in the NTC thermistor heating up and its resistance dropping during charging of the bulk storage capacitor. This allows the NTC thermistor resistance to drop sufficiently to allow the power supply unit to properly power up; however, the time necessary to charge the bulk storage capacitor may be unacceptably long. For example, see the background of U.S. patent application publication US2013/0223120.

It is also known to actively control in-rush current as opposed to the passive control of the NTC thermistor. However, active control requires more component parts and may increase the cost of the PFC circuit and power supply unit.

SUMMARY

This section provides a general summary of the disclosure, and is not a comprehensive disclosure of its full scope or all of its features.

A power factor correction (PFC) stage of a power supply unit has a PFC circuit including a rectifier circuit for connection to an input power source, a PFC controller circuit connected to the rectifier circuit, where the PFC controller circuit includes a PFC switch, a current sensor connected to the PFC switch, at least one high frequency bypass capacitor connected between the PFC controller circuit and the rectifier circuit, and at least one bulk storage capacitor connected between the PFC controller circuit and an output of the PFC stage. The PFC stage also has a negative temperature coefficient (NTC) thermistor connected in series with the PFC switch and the current sensor. During a start-up of the power supply unit, the PFC controller circuit causes the PFC switch to turn-on until the PFC controller circuit causes the PFC switch to turn-off after a current through the current sensor is sensed as being equal to or greater than a preset value.

A method of controlling a power factor correction (PFC) stage of a power supply unit includes the steps of starting the power supply unit, turning on a PFC switch, keeping the PFC switch on while a current through the PFC switch is less than a preset value, turning off the PFC switch when the current through the PFC switch is equal to or greater than the preset value, and operating the PFC stage normally after the PFC switch is turned off.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
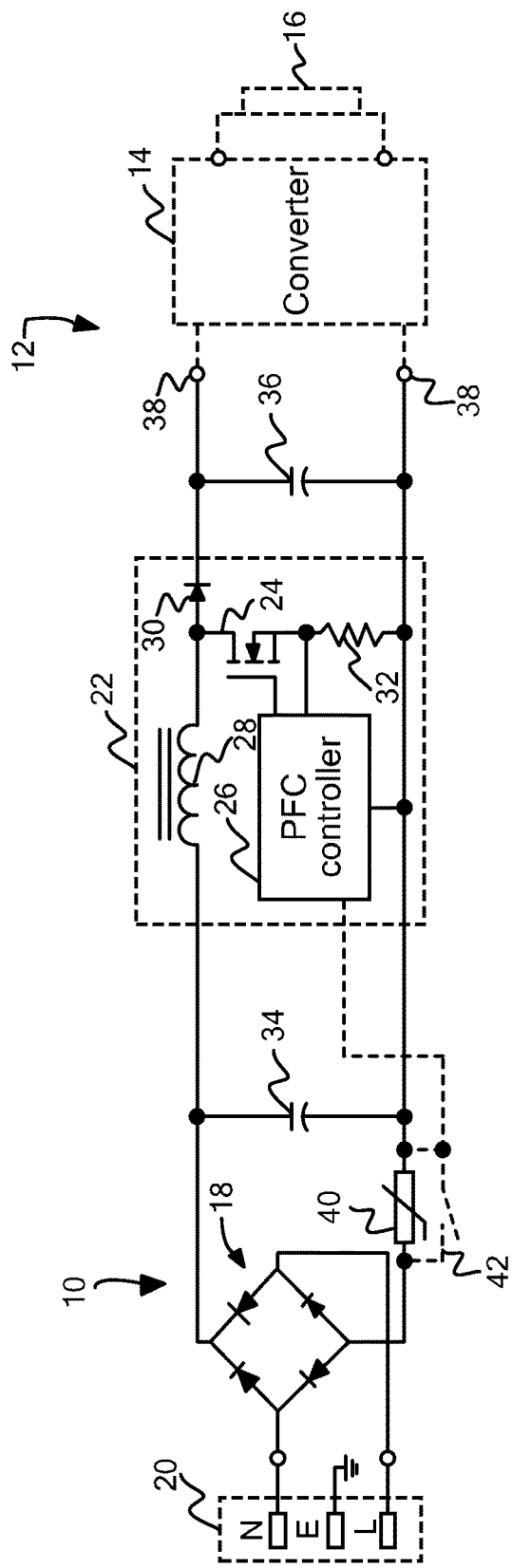
FIG. 1 is an example PFC stage of a power supply unit.

FIG. 1 shows a power factor correction (PFC) stage 10 of a power supply unit 12. The power supply unit 12 may include the PFC stage 10 and a converter 14 that may be connected to a load 16. The converter 14 may include an LLC circuit and a buck converter, or depending on the design criteria and the expected load 16 converter 14 may be another type of converter as is known.

The PFC stage 10 may include a PFC circuit including a rectifier circuit 18 for connection to an input power source (shown as dashed box 20). A PFC controller circuit, shown generally within dashed box 22, may be connected to the rectifier circuit 18. The PFC controller circuit 22 may include a PFC switch 24 and may further include at least a digital PFC controller 26, at least one inductor 28, and a diode 30. A current sensor 32 may be connected to the PFC switch 24 and may also form a part of PFC controller circuit 22. The current sensor 32 may be alternatively connected at a location such that it is not a part of PFC controller circuit 22. The PFC circuit may also include at least one high frequency bypass capacitor 34 connected between the PFC controller circuit 22 and the rectifier circuit 18. The PFC circuit may also include at least one bulk storage capacitor 36 connected between the PFC controller circuit 22 and an output 38 of the PFC stage. The PFC stage 10 also may include a negative temperature coefficient (NTC) thermistor 40 connected in series with the PFC switch 24 and the current sensor 32. In the disclosed example, the PFC circuit includes all of the same components as the PFC stage 10, except for the NTC thermistor 40.

During a start-up of the power supply unit 12, the PFC controller circuit 22 causes the PFC switch 24 to turn-on until the PFC controller circuit 22 causes the PFC switch 24 to turn-off after a current through the current sensor 32 is sensed as being equal to or greater than a preset value. Turning on the PFC switch 24 at start-up bypasses bulk storage capacitor 36 and allows current to immediately begin to flow through the NTC thermistor 40 without waiting for any delays caused by the initial charging of the bulk storage capacitor 36. This allows the NTC thermistor 40 to heat up quickly and efficiently to enable the power supply unit 12 to power up earlier and operate normally.

For example, an output of the PFC stage 10 at output 38 may be 90 Watts at 28 Volts with a peak current of 3.2 Amps. An initial resistance of an NTC thermistor may be low, e.g. 10 Ohms, at an ambient temperature of 25° C. (room temperature); however, the same NTC thermistor's initial resistance may be more than an order of magnitude greater, e.g., 150 Ohms, compared to room temperature resistance, if the ambient temperature is very low, e.g., −40° C. The large initial NTC thermistor resistance causes a significant voltage drop at the output 38 upon start-up; this is especially true at a full load condition at a low ambient temperature. The combined resistance of the load and the NTC thermistor must be low enough to enable enough power to be supplied at the output 38 to allow the converter 14 to start-up properly. For this example, for the power at the output 38 to reach 90 Watts, the combined resistance for both the load and the NTC thermistor should be about 22.5 Ohms.

Using the disclosed control scheme above at start-up, the PFC switch is turned on continuously until the current through the PFC switch and the NTC thermistor reaches a preset value. This in turn allows the NTC thermistor to heat up and its resistance to drop efficiently without a need for any additional components allowing for a compact, simple, and cost effective design. The preset value may be set based on the performance and specification of the particular NTC thermistor chosen. For example, a current of 5 Amps may be sufficient to cause the NTC thermistor's resistance to drop to a low level, e.g., about 18 Ohms. Power supply units employing the disclosed example may be effectively implemented in a variety of power supplies, e.g., adaptors and chargers.

The input power source 20 may be an alternating current source.

The PFC switch may be a MOSFET device or another suitable switch as may be appropriate for the intended application and use of the PFC stage 10 and power supply unit 12.

The current sensor 32 is disclosed as a resistor but may be other types of sensors as are known. For example, other types of current sensors may include fiber-optic sensors, Hall-effect sensors, current-sensing integrated circuits, direct or in-direct sensors, or even current estimators that do not sense a current but rather estimate a current based on other known circuit parameters.

The NTC thermistor 40 may further include a bypass switch, shown at dashed line 42, connected in parallel with the NTC thermistor 40. The bypass switch 42 may be turned on once the PFC switch 24 is turned off at start-up. The bypass switch 42 may increase the power efficiency of the PFC stage 10 by reducing the overall resistance by eliminating the NTC thermistor 40 from the circuit once the initial in-rush currents are limited and the NTC thermistor 40 has fulfilled its intended purpose.

The PFC controller circuit may also cause the PFC switch 24 to be turned on for at least a minimum number of power cycles of the power source after the current through the current sensor 32 is equal to or greater than the preset value. The minimum number of power cycles may be predetermined and set in the PFC controller 26, based on the performance requirements, the acceptable time delay in powering up the power supply unit 14, and the designer's confidence that the NTC thermistor's resistance will have dropped sufficiently.

The example disclosed shows a single inductor 28; however, it is noted that a particular PFC stage design may include multiple inductors, inductor with multiple windings, or a combination depending on the design specifications. Likewise, the high frequency bypass capacitor 34 and/or the bulk storage capacitor 36 may be formed of one or multiple capacitors. Also, PFC stage topographies, other than the disclosed FIG. 1 example, may also effectively employ the control scheme disclosed.

Figure 2:
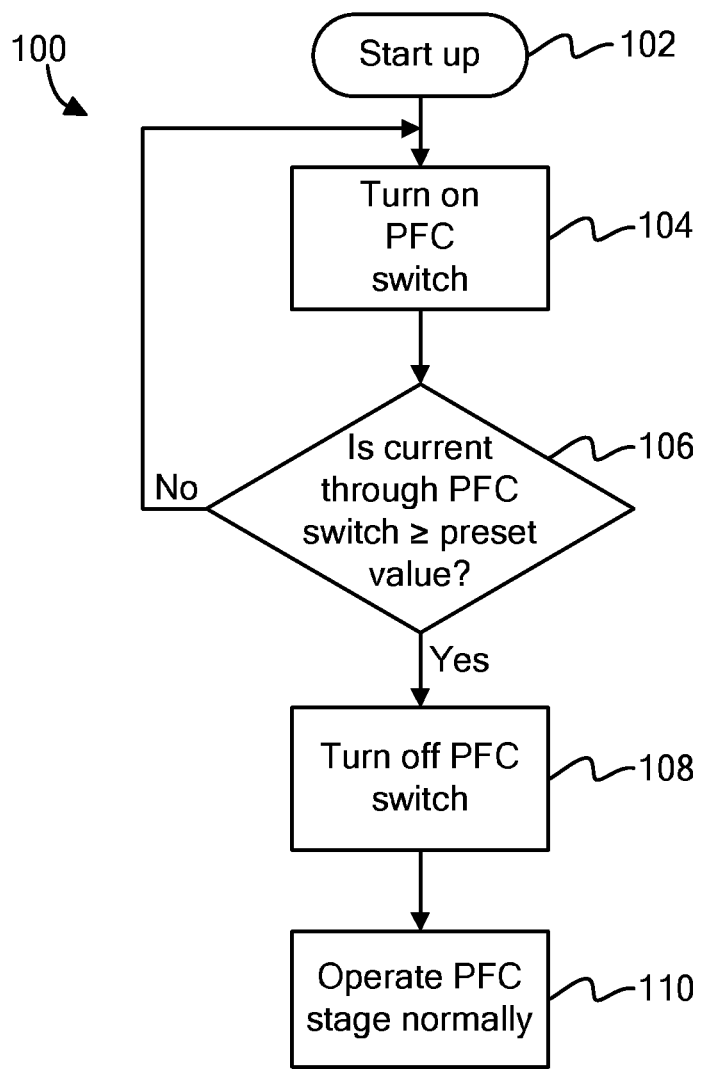
FIG. 2 is an example logic flow for the FIG. 1 example.

FIG. 2 shows an example method 100 of controlling the power factor correction (PFC) stage 10 of the power supply unit 12. The method 100 may be, for example, programed into the PFC controller 26. The method 100 may include starting the power supply unit 12 at 102 and turning on the PFC switch 24 at 104. The method 100 may include determining if the current through the PFC switch 24 is equal to or greater than the preset value at 106. The PFC switch 24 is on while a current through the PFC switch is less than the preset value. The method 100 further includes turning off the PFC switch 24 when the current through the PFC switch 24 is equal to or greater than the preset value at 108. The preset value may be selected so that it indicates that a resistance of the NTC thermistor 40 of the PFC stage 10 is sufficiently low to allow the power supply unit 12 to operate normally. The method 100 further includes operating the PFC stage 10 normally after the PFC switch 24 is turned off at 110.

The method 100 may further include connecting a bypass switch 42 in parallel with the NTC thermistor 40 and turning on the bypass switch 42 once the PFC switch 24 is turned off.

The method 100 may still further include causing the PFC controller circuit 22 to turn on the PFC switch 24 for at least a minimum number of power cycles of the power source 20 after the current through the current sensor 32 is equal to or greater than the preset value.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

What is claimed is:

1. A power factor correction (PFC) stage of a power supply unit, the PFC stage comprising:
    a PFC circuit including a rectifier circuit for connection to an input power source, a PFC controller circuit connected to the rectifier circuit and including a PFC switch, a current sensor connected to the PFC switch of the PFC controller circuit, at least one high frequency bypass capacitor connected between the PFC controller circuit and the rectifier circuit, and at least one bulk storage capacitor connected between the PFC controller circuit and an output of the PFC stage; and
    a negative temperature coefficient (NTC) thermistor connected in series with the PFC switch of the PFC controller circuit and the current sensor to limit an in-rush current in the PFC circuit, and
    wherein, during a start-up of the power supply unit, the PFC controller circuit is configured to turn-on the PFC switch continuously to allow a current through the NTC thermistor to increase and a resistance of the NTC thermistor to decrease, and turn-off the PFC switch after the current through the NTC thermistor is sensed as being equal to or greater than a preset value based on the resistance of the NTC thermistor.

2. The PFC stage of claim 1 wherein the input power source is an alternating current source.

3. The PFC stage of claim 1 wherein the PFC controller circuit further includes at least a digital PFC controller, at least one inductor, and a diode.

4. The PFC stage of claim 1 wherein the PFC switch is a MOSFET device.

5. The PFC stage of claim 1 wherein the current sensor comprises a resistor.

6. The PFC stage of claim 1 further comprising a bypass switch connected in parallel with the NTC thermistor, wherein the bypass switch is turned on once the PFC switch is turned off.

7. The PFC stage of claim 1 wherein the PFC controller circuit further causes the PFC switch to be turned on for at least a minimum number of power cycles of the power source after the current through the NTC thermistor is equal to or greater than the preset value.

8. A method of controlling a power factor correction (PFC) stage of a power supply unit during a start-up of the power supply unit, the PFC stage including a PFC switch, a current sensor, and a negative temperature coefficient (NTC) thermistor to limit in-rush current, the method comprising:
    controlling the PFC switch of the PFC stage to turn on continuously to allow a current through the NTC thermistor connected in series with the PFC switch and the current sensor to increase and a resistance of the NTC thermistor to decrease; and
    controlling the PFC switch to turn off when the current through the NTC thermistor is equal to or greater than a preset value based on the resistance of the NTC thermistor.

9. The method of claim 8 wherein the PFC stage is connected to an alternating current power source.

10. The method of claim 8 wherein the PFC stage further includes a rectifier circuit and a PFC controller circuit having at least a digital PFC controller, at least one inductor, and a diode.

11. The method of claim 8 wherein the PFC switch is a MOSFET device.

12. The method of claim 8 wherein the current sensor comprises a resistor.

13. The method of claim 8 further comprising turning on a bypass switch connected in parallel with the NTC thermistor once the PFC switch is turned off.

14. The method of claim 8 further comprising turning on the PFC switch for at least a minimum number of power cycles of a power source after the current through the NTC thermistor is equal to or greater than the preset value.

* * * * *